United States Patent [19]

Ladizesky et al.

[11] 4,410,586

[45] Oct. 18, 1983

[54] POLYMERS IN MATRIX REINFORCEMENT

[75] Inventors: Noe H. Ladizesky; Ian M. Ward, both of Leeds; Leslie N. Phillips, Farnborough, all of England

[73] Assignee: The Secretary of State for Defence in Her Britannic Majesty's Government of the United Kingdom of Great Britian and Northern Ireland, London, England

[21] Appl. No.: 364,458

[22] Filed: Apr. 1, 1982

[30] Foreign Application Priority Data

Apr. 4, 1981 [GB] United Kingdom ................. 8110613

[51] Int. Cl.³ .................... B32B 7/00; D03D 3/00; B44C 1/22; C03C 15/00
[52] U.S. Cl. ................................ 428/245; 156/62.2; 156/181; 156/272.6; 156/643; 156/629; 156/646; 156/651; 156/668; 204/192 E; 427/39; 427/307; 428/288; 428/290; 428/375
[58] Field of Search ............... 156/643, 646, 651, 629, 156/668, 62.2, 180, 181, 272.6; 204/164, 192 E, 192 EC; 427/39, 40, 41, 307; 428/221, 245, 288, 290, 375, 322

[56] References Cited

U.S. PATENT DOCUMENTS

| 3,440,418 | 4/1969 | Piazza | 204/164 X |
| 3,676,249 | 7/1972 | Lemelson | 156/272.6 X |
| 3,813,282 | 5/1974 | Masotti et al. | 156/62.2 X |
| 3,962,386 | 6/1976 | Driscoll | 156/272.6 X |

Primary Examiner—William A. Powell
Attorney, Agent, or Firm—Cushman, Darby & Cushman

[57] ABSTRACT

A method of producing a composite material in which a reinforcing material (eg as fibres) is embedded in a matrix material is characterized in that the reinforcement material comprises a polymer material having a draw ratio of at least 12:1 which is plama treated, prior to incorporation in the matrix, preferably to produce pitting in its surface whereby improved adhesion is obtained between the reinforcement material and the matrix material by mechanical interlocking of the pitted surface of the reinforcement material and the complementary surface of the matrix material. Preferably, the surface pitting is effected by a plasma discharge treatment. Preferably the average pit size is from 0.1 to 4 microns.

26 Claims, No Drawings

POLYMERS IN MATRIX REINFORCEMENT

The present invention relates to reinforced composite materials containing polymers and to the production thereof.

Composite materials comprising a matrix material containing a reinforcement material, eg in the form of fibres, embedded therein are well known. There are a variety of materials which are known for use as the matrix material and also a variety which are known for use as the reinforcement material. One widely used composite material, for example, consists of a resin matrix containing as a reinforcement aligned or random glass fibres. This can show fairly good mechanical properties and may be used in a number of structural applications.

There is always a demand for new composite materials having improved properties however.

It is desirable, for example on grounds of structural efficiency to produce a composite material which is relatively lightweight but shows reasonably good mechanical properties.

A number of polymers are known which are relatively lightweight and which have been formed into fibres. However, conventional polymer fibres have relatively poor mechanical properties and are not suitable to form composites for use in structural applications. For example, conventional polyethylene fibres are well known and have been used in textile fabrics and rope-making but they are not suitable for use in structural composites.

Polymer fibres such as polyolefin fibres are conventionally stretched by passing them from a slowly rotating roller to a fast rotating roller at room temperature. The degree of stretch imparted to the fibres depends on the ratio of the two roller speeds. If the ratio normally exceeds about 10:1 for a commercial stretching process the fibres will break. Thus, conventional polymer fibres are not made with a draw ratio, which is the ratio of the stretched length: unstretched length, greater than about 10:1 and this limits their mechanical properties and the range of applications in which they may be used.

Methods of obtaining polymer materials, particularly homo- or co-polyolefins, which are highly oriented, ie with high draw ratios, are described in U.K. Pat. Nos. 1,469,526, 1,480,479, 1,498,628, 1,506,565 and 1,568,964.

Oriented polyolefins produced by the methods described in the Specifications referred to can be obtained with draw ratios greater than 12:1, eg 15:1 or greater, in some cases typically 30:1.

Essentially, the material is transferred between rollers in a sequence of transfer operations having, from roller to roller, a gradual increase in speed, the speed ratio of the rollers in each transfer being much less than is used conventionally. The stretching is carried out at a high temperature, typically 10°–20° C. below the polymer melting point.

As a result, the polymer materials produced by the methods described in the Specifications referred to above can be obtained with Young's moduli far in excess of conventional forms of the polymer materials and they may be produced in the form of fibres, film or fibrillated film. Such materials may also exhibit other physical properties, for example ultimate tensile strength and creep resistance, that would render them particularly suitable for the reinforcement of matrices for structural applications; and as the specific gravity of such polymer materials can be generally low, eg in the case of polyolefins, they offer the attractive possibility of lightweight composites for structural applications.

However, we have found that if an attempt is made to produce a composite material by incorporating a highly oriented polymer material (ie a polymer material having a draw ratio of 12:1 or greater), eg fibres, in a matrix material considerable difficulty is encountered. One way of investigating a new reinforcement material for use in composites to incorporate fibres of the material untreated in different matrix resins. When we tried this conventional approach we found that the levels of adhesion between the reinforcement polymer and the matrices were very low. The resulting composites were of little practical use.

It is one purpose of the present invention to provide a method of producing a composite material comprising a highly oriented polymer such as a homo- or co-polyolefin embedded in a matrix material with a level of adhesion such that the composite material may be used in practical applications.

According to the present invention in a first aspect there is provided a method of producing a composite material in which a reinforcement material is embedded in a matrix material characterised in that the reinforcement material comprises a polymer material having a draw ratio of at least 12:1 which is treated prior to incorporation in the matrix by exposing its surface to a plasma discharge.

Preferably, the draw ratio of the polymer material is 20:1 or more.

Preferably, the highly oriented polymer for incorporation into a given matrix material, is subjected to a plasma treatment which provides surface pitting therein; preferably contributing to an adhesion level (as herein defined) of the body to the matrix material which is at least $10^6 N/m^2$ and preferably in the range of from $3 \times 6 \times 10^6 N/m^2$. Such pitting provides mechanical interlocking of the pitted surface of the reinforcement material to the complementary surface of the matrix material.

Desirably, such surface pitting is of a generally uniform nature over the surface of each body incorporated. Preferably, the average maximum dimension of each pit is from 0.1 to 4 microns. The combination of pit size and any modification of wetting characteristics of the surface of the body are such that when the treated body is immersed in a resin matrix the resin penetrates the pits so that on cure a mechanical interlocking is effected between the resin and the oriented polymer body.

Preferably, such surface pitting is effected by exposure of the highly oriented polymer material (eg in the form of fibres) to a plasma discharge in oxygen. It is highly unexpected that plasma treatment produces the desired pitting since it is known, for example, that plasma treatment of unstretched polymer films merely smooths the surface profile of the film. Smoothness of surface is normally undesirable in a reinforcement material, eg fibre, because this reduces the level of contact and hence adhesion with the matrix.

Preferably, plasma treatment is preceded by chemical treatment, eg immersion in acid.

We have found that surface modification by plasma treatment can adversely affect certain physical properties of the highly oriented polymer. Preferably to highly oriented polymer is subjected to a surface-modification treatment to produce surface pitting therein in a manner such that the ultimate tensile strength (as herein defined) of the polymer is not reduced below a value of $0.4 \times 10^9 N/m^2$. Desirably the ultimate tensile strength does not fall below $0.5 \times 10^9 N/m^2$. We particularly pefer that if the treatment is such as to provide polymer bodies having ultimate tensile strength values within the range 0.5 to $0.7 \times 10^9 N/m^2$ adhesion levels to the given matrix material are at least $3 \times 10^6 N/m^2$, eg from 3 to $6 \times 10^6 N/m^2$.

The surface-modification treatment can be controlled to give the desired properties as specified by adjusting the parameters, eg power level and time of exposure, involved in the plasma discharge.

We have found on observation of highly oriented polymer fibres used in accordance with the method of the first aspect, that the likely mechanism operating when a monofilament is pulled from the surrounding matrix material is in many cases internal shearing of the mono-filament, with the core of the mono-filament pulling away from a surface layer thereof that remains keyed to the resin. From a further standpoint therefore, a highly oriented polymer, for incorporation into a given matrix material, is preferably subjected to a surface-modification treatment such that the adhesion level (as herein defined) of the polymer to the matrix material is not less than the peel-off strength between a surface layer of the polymer body (eg fibre) and the remainder of the body. Thus, the actual bond that is effected between the surface layer and the matrix is at least as strong as the peel-off strength between that layer and the remainder of the body.

Preferably, the highly oriented polymer material comprises a homo- or co-polyolefin, eg polyethylene, polypropylene or a polyethylene-polyester copolymer, eg polyethylene-terephthalate. It may also comprise nylon or an aramid.

The highly oriented polymer material may be in the form of film or fibrillated film, but is preferably in the form of fibres. The fibres may be in monofilament, multifilament yarn, staple fibre or woven fibre form. The oriented polymer material may be in the form of a hybrid with fibres of other material eg carbon and/or glass fibres or polyaramid (eg Kevlar). In this case, the hybrid is preferably in woven form.

If the highly oriented polymer is produced in the form of a film the film may be split along its direction of drawing into ribbon-like strips, before incorporation into the matrix, eg by tapping with revolving pins in a known way.

Preferably, the matrix material is a cold or warm setting thermosetting resin or a thermoplastic matrial with a softening point less than the softening point of the oriented material.

Examples of matrix materials that may be used include, for example, plasticised polyvinylchloride and co-polymers including vinylchloride, and inorganic cements such as Portland or aluminous cement. Preferred thermosetting resins for use as matrix material include phenolic, epoxy, vinyl ester, polyester and thermosetting acrylate resins such as cyanoacrylates and polymethylmethacrylate.

The highly oriented polymer is preferably a mono- or co-polyolefin having a Young's modulus (as hereinafter defined) in excess of $3 \times 10^{10} N/M^2$. It preferably has a weight average molecular weight ($\overline{M}_w$) of less than 300,000, desirably less than 200,000. It conveniently has a number average molecular weight ($\overline{M}_N$) of from 5,000 to 25,000. When $\overline{M}_N$ is greater than 10,000 preferably the ratio $\overline{M}_w/\overline{M}_N$ is less than 10, more preferably less than 8. When $\overline{M}_N$ is 10,000 or less preferably the ratio $\overline{M}_w/\overline{M}_N$ is less than 25, more preferably less than 20.

The highly oriented homo- or co-polycolefin body, eg fibre, may in a further embodiment, have a weight average molecular weight greater than 150,000, and a ratio $\overline{M}_w/\overline{M}_N$ greater than 5, and be capable of sustaining a creep strain at room temperature of less than 3% after 15 hours under a stress which produces an initial strain of 1% after 10 seconds. Such bodies may preferably also have a Young's modulus (as hereinafter defined) in excess of $3 \times 10^{10} N/m^2$.

Particularly preferred polyolefins are polyethylene, polypropylene, ethylene-propylene block copolymers, and copolymers of ethylene containing at least 95% by weight of ethylene having a density of from 0.85 to 1.0 gms/cm$^3$ as measured by the method of British Standard Specification No. 2782 (1970) method 509B on a sample prepared according to British Standard Specification No. 3412 (1966) Appendix B(1). Other polyolefins usable in the present invention are described in the aforementioned British patent specifications which also fully describe methods of forming preferred oriented polymer fibres from molten polymer. Other usable fibres may be prepared by spinning from a dilute solution of polymer having molecular weight substantially in excess of the figures given above.

Plasma treatment of the reinforcing polymer bodies may be effected using any suitable plasma carrier gas, for example air or oxygen, and effecting the treatment at a power of not more than 20 watts for a period not exceeding 30 minutes with a gas flow of not more than 10 cc per minute. Maximum power of 10 watts is preferred, although reasonable results may be achieved with power somewhat above or below this figure. Increasing the power significantly above 10 watts produces little benefit in adhesion or physical properties, and may create a risk of causing heat damage to the reinforcing polymer bodies. The range of treatment times may extend from two minutes to thirty minutes. Longer treatment times lead to better adhesion values, although these are obtained at the expense of a reduction in ultimate tensile strength. The preferred treatment time is from two to ten minutes. The preferred range of gas flow is from 6 to 10 cc per minute; it is found that higher flows lead to better adherence values, but flows in excess of 10 cc per minute should again be avoided in view of potential thermal damage to the polymer bodies.

A preferred chemical treatment is immersion of the reinforcing polymer body in a chromic acid bath at a $K_2Cr_2O_7$ concentration of from 1 to 100 molar % for a period ranging from half a minute or less to ten minutes or more. The adhesion level is found to increase with indcreasing severity of treatment, ie as the $K_2Cr_2O_7$ concentration or the duration of treatment increases. However, increasing severity of treatment, also results in a small corresponding reduction in ultimate tensile strength. In practice the treatment used should be chosen to achieve the required balance between adhesion level and ultimate tensile strength, and it has been found particularly advantageous to subject the polymer bodies to chromic acid treatment and then to subsequent plasma treatment. Surprisingly, this gives substantially better properties than the reverse treatment order, ie plasma treatment followed by acid treatment. Accordingly, a particularly preferred embodiment of the invention is to subject the reinforcing polymer body to chromic acid treatment at a concentration of from 1 to 100 molar % of $K_2Cr_2O_7$ for from half a minute to ten minutes and subsequently to expose the body to plasma treatment at a power of not more than 10 watts and gas flow of not more than 10 cc per minute for a period of about two minutes. In this way it is found that adhesion levels in excess of $3 \times 10^6 N/m^2$ coupled with ultimate tensile strengths of not less than $0.65 \times 10^9 N/m^2$ can be achieved, this combination of properties leading to good composite materials when the polymer body is embedded into an epoxy of polyester matrix.

If the polymer material has previously been in contact with a low moleculr material such as glycerol (eg during stretching) it should preferably be cleaned before exposure to the plasma treatment and before chemical treatment (if any). Cleaning may be effected by water or acetone and desirably a mechanical rubbing is effected during cleaning. Alternatively, cleaning may be effected by exposing the polymer to chromic acid, and in a particular method wherein surface modification is effected first by chromic acid exposure and then by plasma treatment no cleaning step pior to the acid exposure may be required, although a preliminary water wash is presently preferred.

In some cases it may be advantageous further to treat the surface-modified polymer with an adhesion promoter, for example a silane, before incorporation into the resin matrix. Suitable promoters may increase the adhesion levels obtainable with some surface-modification techniques and may also improve the maintenance of those levels during ageing of the composite, and improve the water resistance of the composite.

According to the present invention in a second aspect there is provided a composite material produced by the method of the first aspect in which polymeric reinforcement material having a draw ratio of at least 12:1 is incorporated in a matrix material the polymeric reinforcement material having been treated by a plasma treatment whereby improved adhesion is obtained between the reinforcement material and the matrix material. Preferably mechanical interlocking of the surface of the reinforcement material and the complementary surface of the matrix material is provided by pitting on the reinforcing material (eg fibre) surface.

Composite materials embodying the second aspect may be produced with a reasonably good ultimate tensile strength combined with a low specific gravity. They may also have other favourable properties, eg good impact resistance. Examples of applications in which the materials may be used are as listed below.

According to the present invention in a third aspect there is provided polymeric reinforcing material, suitable for incorporation in a matrix material to produce a composite by the method of the first aspect, which polymeric reinforcing material has draw ratio of at least 12:1 and which has surface pitting to give improved adhesion to a matrix material when the polymeric reinforcing material is incorporated in the matrix material.

In this specification, adhesion level is defined as being the adhesion between a monofilament of the polymer material and the surrounding matrix material measured by a pull-out test in the following manner. A single mono-filament of measured diameter is immersed in a disc of the resin, the mono-filament being perpendicular to the plane of the disc. The disc is secured in the top clamp of a floor model Instron (Registered Trade Mark) machine type TT-B and a free end of the mono-filament secured to the bottom clamp of the machine, the filament length from the mould to the bottom clamp being from 15 to 20 cm. The machine is operated with a cross-head speed of 1 mm per minute to give a rate of loading of about 1.7 N/min. The load at which the mono-filament pulls free of the disc, or at which internal shear of the mono-filament occurs, is measured. The immersion length of mono-filament in the disc is measured with a micrometer on the disc after pull-out of the mono-filament. The adhesion level, in $N/m^2$, is calculated as the pull-out force per unit of interface area between the mono-filament and disc, although it will be understood that where the mechanism of failure is internal shear there is no direct proportionality between the pull-out force and the immersion length. The adhesion values quoted in this specification refer to a nominal immersion length of 4.7 mm.

In this specification, the ultimate tensile strength of a polymer material is defined as being the strength of a fibre of the material as measured by the following test. The ends of the fibre under test are secured to the clamps of a floor model Instron machine type TT-B and extension applied at 20%/min, With a gauge length of 10 cm. The load at which the fibre breaks is measured and from that figure and the fibre diameter before extension the ultimate tensile strength is calculated in $N/m^2$.

In this specification, Young's modulus is defined as being the modulus measured at 20° C. by a dead-loading creep experiment as described by Gupta and Ward in J. Macromol. Sci. Phys. B1 373(1967), taking the stress required to produce a strain response of 0.1% at ten seconds.

Embodiments of the present invention will now be described further, with reference to particular examples.

Mono-filaments used in a first series of Examples 1–26 were spun from Unifoss 2912 (Trade Mark) high density polyethylene granules, the polymer material having a melt flow index of 0.20, a weight average molecular weight $\overline{M}_w$ of 224,000, $\overline{M}_w/M_n = 9.3$. The fibre was spun into a glycerol quench bath at 110° C. and subsequently drawn 30:1 in a glycerol bath at 120° C. to give oriented high density fibres having diameters varying between 0.25 mm and 0.27 mm and a Young's modulus of $3.8 \times 10^{10} N/m^2$.

Washing, when effected was carried out by immersing the mono-filament in a washing bath of the material referred to and then wiping the mono-filament with cotton wool soaked in that material. Plasma treatment, when used, was effected by placing coils of the mono-filament in the barrel reactor of the 13.56 MHz Plasmaprep 100 equipment made by Nanotech. In the examples that follow, oxygen was used as the plasma carrier gas, except in run 2 shown in Table 1, when the plasma carrier gas was air. In Table 1 plasma treatment is indicated by the letter P followed by three figures, eg P20/2/10. The first figure is the power in watts, the second the length of treatment in minutes and the third the gas flow in cc/minute.

Acid treatment, when used, was carried out in one of two batches of chromic acid, acid 1% and acid 100%. The composition of the first batch was (by weight) 12 parts water, 150 parts concentrated sulphuric acid and 0.07 parts potassium dichromate. The composition of the second bath (the "standard" composition for chromic acid) was 12 parts water, 150 parts concentrated sulphuric acid and 7 parts of potassium dichromate. In Table 1 acid treatment is indicated by the letter A followed by two figures, eg A1/0.5. The first figure indicates the percentage concentration of $K_2Cr_2O_7$ and the second indicates the duration of treatment in minutes.

All treatments and measurements were initiated or effected at room temperature, it being understood that some temperature increases will occur during plasma treatment.

In the first series of examples Examples 1 to 26 each mono-filament was immersed over a mono-filament length of from 4.4 to 5.1 mm in a disc of XD927, a low viscosity epoxy resin supplied by Ciba-Geigy. The results of 26 runs are shown in Table 1 below.

TABLE 1

Examples 1–26 (Run Numbers 1–26)

| Run No | Washing (Bath & wipe) | First Treatment | Second Treatment | Adhesion Level ($\times 10^6 N/m^2$) | Ultimate Tensile Strength ($\times 10^9 N/m^2$) |
|---|---|---|---|---|---|
| 1 | None | None | None | 0.44 | 1.04 |
| 2 | None | P20/2/10 | None | 1.5 | — |
| 3 | None | P20/2/10 | None | 1.64 | 0.91 |
| 4–7 | None | P10/10/10 | None | 2.9;3.3; 3.8;3.9 | — |
| 8–11 | Acetone | P10/10/10 | None | 3.1;3.4; 3.6;3.6 | 0.66 (Run 9) |
| 12–13 | Water | P10/10/10 | None | 4.1;4.48 | 0.56;0.62 |
| 14 | Acetone | P20/10/10 | None | 3.12 | — |
| 15 | Acetone | P20/10/6 | None | 2.21 | — |
| 16 | Acetone | P10/30/10 | None | 5.45 | 0.4 |
| 17 | Water | A1/0.5 | None | 0.75 | 0.93 |
| 18 | Water | A100/10 | None | 1.17 | 0.77 |
| 19 | Water | P10/10/10 | A1/0.5 | 3.0 | 0.53 |
| 20 | Water | P10/10/10 | A1/10 | 3.86 | — |
| 21 | Water | P10/10/10 | A100/10 | 4.04 | 0.47 |
| 22 | Water | A100/0.5 | P10/10/10 | 5.03 | 0.54 |
| 23 | Water | A1/0.5 | P10/10/10 | 4.68 | 0.58 |
| 24 | Water | A1/10 | P10/2/10 | 3.33 | — |
| 25 | Water | A100/10 | P10/2/10 | 3.14 | 0.70 |
| 26 | Water | A1/0.5 | P10/2/10 | 3.12 | 0.66 |

As will be seen from the Table, run 1 is a control run and indicates that the untreated fibre has an adhesion level of $0.44 \times 10^6 N/m^2$ and an ultimate tensile strength of $1.04 \times 10^9 N/m^2$. Runs 2 to 16 show the effect of various plasma treatments on the fibres. The treatments of short duration shown in runs 2 and 3 provide a threefold increase in adhesion level. Even better adhesion is obtained with treatments of longer duration, for example the ten minute treatment shown in runs 4 to 15 and the thirty minute treatment shown in run 16. It should be particularly noted, however, that in the longer treatments the adhesion levels are increased at the expense of ultimate tenile strength. Runs 2, 3, 14 and 15 indicate that there is no particular virtue in carrying out the plasma treatment at powers as high as 20 watts, and indeed treatment at 10 watts is preferred in order to avoid heat damage to the fibres.

Acid treatment of the fibres, as shown in runs 17 and 18 also leads to improvement in the adhesion level, although this is not very significant as the adhesion levels obtained are well below the desirable adhesion level of $3 \times 10^6 N/m^2$. Thus, like the results for untreated fibres, the results for acid treated fibers are included for illustration only. Runs 19 to 26 illustrate the results of combined runs an acid treatment follows the plasma treatment and from a comparison of these with runs 12 and 13 it will be seen that no advantage is apparent when compared with the plasma treatment alone, and indeed somewhat lower adhesion figures are noticed. However, the opposite is true for acid treatment followed by plasma treatment as will be seen from runs 22 and 23 in comparison with runs 12 and 13. Runs 24 to 26 show that reasonable adhesion levels can be achieved without too high a decrease in tensile strength if acid treatment of the fibres is followed by a relatively weak plasma treatment, ie exposure for only two minutes. Clearly, such low exposure times are preferable for production purposes.

Scanning electron micrographs of fibres used in certain of the foregoing runs have been taken both before incorporation into the resin matrix and after pull-out from the resin matrix. They show that plasma treatment of the fibres is capable of effecting pitting of the fibre surface, the pitting being of a generally uniform nature over the fibre surface. Longer plasma treatment increases the size of the pits and the incidence of larger than average pits. P10/10/10 treatments lead to pits having an average maximum dimension of from 1 to 4 microns.

EXAMPLE 27

Mono-filament prepared as aforesaid was subjected to A1/0.5 chromic acid treatment followed by P10/10/10 plasma treatment and was then immersed in a disc of Crystic 272 isophthalic polyester resin of low viscosity supplied by Scott Bader. The adhesion level was measured at the satisfactory figure of $2.8 \times 10^6 N/m^2$, compared to an adhesion level of $0.33 \times 10^6 N/m^2$ for the untreated monofilament. Adhesion to Crystic 272 was also tested on a further sample subjected to A1/10 chromic acid treatment, subsequent P10/10/10 plama treatment and then to coating with vinyl-tris (beta-methoxyethoxy) silane, an adhesion promotor sold by Union Carbide as A172. The adhesion level was found to be $3.4 \times 10^6 N/m^2$.

EXAMPLE 27a

Mono-filament prepared as aforesaid was subjected to a A1/10 chromic acid treatment followed by P10/10/10 plasma treatment and was then immersed in a disc of epoxy XD 927 resin supplied by Ciba-Geigy. The adhesion level was measured at the satisfactory figure of $3.7 \times 10^6 N/m^2$ (compared with an adhesion level of $0.44 \times 10^6 N/m^2$ for the untreated mono-filament). Adhesion to XD 927 was also tested in a further sample subjected to A1/05 chromic acid treatment subsequent P10/10/10 plasma treatment and then to coating with gamma-aminopropyltriethoxysilane silane, an adhesion promoter sold by Union Carbide Corp. as A-1100. The adhesion level was found to be $3.7 \times 10^6 N/m^2$.

EXAMPLE 28

High density polyethylene Selair 2909 Grade polymer was melt spun into a quench bath and then drawn at 25:1 in a glyceral bath at 110° C. Yarn was formed by joining 4 strands each spun with 9 ends of the resulting filament to give a yarn of 120 decitex formed from 36 ends each of 30 microns diameter. Bundles of untreated, acid treated and acid then plasma treated yarn were immersed in a matrix of epoxy resin XD 927. The adhesion levels as measured with the short beam three point bending test known as the interlaminar shear strength (ILSS) test, were as follows: for the untreated yarn $13.4 \times 10^6 Pa$ for the acid treated yarn $21.5 \times 10^6 Pa$; and for the acid and then plasma treated yarn $28.0 \times 10^6 Pa$. The order of the ILSS values obtained agrees well with the conclusions obtained from the full-out tests, although the changes in ILSS are substantially smaller than those obtained when measuring full-out adhesion. Scanning electron micrograph observation of the treated fibres showed that plasma treatment of the bundles effected surface pitting of the fibre, although the average pit size was about 1/10 that observed on monofilaments.

EXAMPLE 29

It will be understood that there are many different ways in which the surface-modified polyolefin bodies of the invention may be incorporated into matrix material to make a composite, and the method of incorporation will of course vary according to whether the polyolefin body is in the form of film, fibrillated film, mono- or multi-filament fibre or staple fibre. Purely by way of example a composite bar reinforced with mono-filament fibres may be produced in the following manner. In this method a two-part mould is used comprising elongated base and top sections, each of uniform cross-section along their length. The base has a central groove formed in the upper surface thereof, the groove being of rectangular cross-section. The top is substantially T-shaped in cross-section having a downwardly extending part that is a close fit within the groove within the base section, but which has a height less than the depth of the groove. The groove in the base section is open-ended. To manufacture a composite bar a release agent was applied to all surfaces of the mould, and after drying a thin layer of the liquid resin being used was poured into the groove in the base section. A bundle of parallel mono-filaments surface treated by any of the methods according to this invention were then laid into a groove on top of the thin resin layer, the monofilaments being longer than the base section so that the ends of the mono-filaments projected beyond the ends of the groove in the base section. Conveniently the mono-filaments were held as a bundle by restraining means on the ends lying outside the groove. Those restraining means were removed and the rest of the resin was poured into the mould, the mono-filaments spreading freely throughout the resin. The top section of the mould was then placed in position and a load applied to the top thereof. A pressure of between 0.5 kg/cm² and 2 kg/cm² was applied and maintained during cure of the resin. After cure the top section was removed and the moulded composite lifted from the mould, the protruding ends of the mono-filaments were then cut away.

It will be understood that in the moulding process described spacers may be used between the top and base sections of the mould in order to achieve composites of a given thickness.

EXAMPLE 30

SEM investigation of failed pull-out samples

"Pull-out" samples were made using plasma treated polyethylene mono-filament fibres which were set in epoxy resin, eg as in Examples 16 and 22 (Run Numbers 16 and 22).

Using a Scanning Electron Microscope (SEM) we examined mono-filaments from pull-out tests by pulling the mono-filaments from the matrix. The inspection was carried out in regions which were immersed in the resin, as well as in regions which were outside the resin. Furthermore, a microtome was used to section several resin discs in order to the pull-out test. These sockets were also examined with the SEM.

Photographs of the plasma treated filaments showed the surface of the matrix resin immersion regions to be different from the surface of the non immersed regions. While the latter presented the pitted structure, the former was mainly fibrillar, with some cavitation (as opposed to pits) and small cracks perpendicular to the fibril direction. All the features indicated that during the pull out test, the skin of the immersed region of the filament had peeled off from the core. We then examined the grooves in the corresponding discs of resin and found them to be covered by a layer showing fibrillation, cavitation and cracks. This was obviously the ripped off skin of the immersed regions of the pull out monofilaments.

This finding was of considerable practical importance because, it means that the adhesion achieved by plasma treatment is sufficiently high so that the failure of the system does not occur at the interface but within the reinforcement.

EXAMPLE 31

Further investigation of the sockets in the resin after pull-out

Pull-out samples were made as in Example 30. Monofilaments were pulled-out from the composites as in Example 30 but in this case the matrix resin was investigated in another way. We exposed the grooves of two further resin discs from which plasma treated mono-filaments had been pulled out. One of the microtomed discs was then heated for 15 minutes at 150° C. (above the melting point of the polyethylene material) and the other was immersed for 2 minutes in xylene at 130° C. Under these conditions the filament material is rapidly dissolved. When observed with the SEM, the groove of the first sample presented all the characteristics of polymer which had been melted. The observation of the groove of the second sample was more revealing because all the polymer had been dissolved away, exposing a surface which was an accurate replica of the pitted surface of the plasma treated mono-filament. Thus, the resin wets the treated filament to a high degree and mechanical interlocking between the filament and resin occurs.

We also examined with the SEM the immersed regions of acid only treated mono-filaments, as well as the grooves in the corresponding discs of resins. There was no evidence of pitting and consequential mechanical interlocking at the interface with the matrix, nor of any filament peeling off.

EXAMPLE 32

Plasma treatment of yarn and the resulting composites

Bundles of yarnn of polyethylene fibres for incorporation into composites were first acid treated, followed by plasma treatment. The conditions were those which gave best adhesion with mono-filaments, ie as in Example 22 (Run Number 22).

SEM observation of the treated yarn showed the expected pitted surface structure, but the average pit size was about 10 times smaller than that of the filament with similar treatment. The ends of the bundles, tightly gripped with rubber bands, were largely unaffected by the plasma treatment. Thus, screening is an important consideration with this technique. In fact, the smaller pit size obtained when treating a bundle of yarn may be due to screening since when we plasma treated a few isolated filaments from the bundles, we observed an average pit size similar to that obtained with monofilaments. However, when treating a few filaments only a shrinkage of about 50% occurred, although this was reduced to about 20% if the filaments were wiped before treatment. Under the SEM unwiped and wiped sets showed the pitted surface structure referred to above.

We measured the ILSS (interlaminar shear strength) of composites reinforced with acid plus plasma treated yarn. The resin was mostly epoxy, but polyester resin was also used. The results show that plasma treatment of the yarn increases the ILSS of the resulting composite by a factor of about 2 when using epoxy resin, with a somewhat lower increase when using polyester resin. The order of the ILSS values obtained agrees well with the conclusions obtained from the pull out tests, although the changes in ILSS are substantially smaller than those obtained when measuring adhesion.

Finally, we measured the deformation to failure of the plasma treated yarn composites and found this to be 6 to 7 times larger then geometrically similar carbon fibre composites. Thus, the former possess excellent energy absorption properties.

EXAMPLE 33

Investigations of the relationship between polymer draw ratio, polymer treatment and polymer/matrix adhesion 33.1 In this study the following experimental conditions were used.

(i) Materials

Monofilaments were prepared with different draw ratios (DR) by stretching at 120° C. DR. 1:1 (isotropic) monofilaments, spun at 210° C. from Unifoss 2912 (Trade Mark) high pressure polyethylene granules, $M_w=224000$, $M_w/M_n=9.3$. The stretching was carried out as described in the UK Patent specification referred to above.

The matrix resins used were epoxy XD 927 and, occasionally, Crystic 272.

(ii) Application of treatments to mono-filaments a. Washing

Fibres used in the present Example were washed by immersing small bobbins (each with 10 g–15 g of fibre) in de-ionized water. The fibres were then run through a bath of de-ionized water and rewound onto another small bobbin. Drying was carried out overnight in an air oven at 40° C.

Further to the cleaning, and prior to plasma treatment, some fibres were wiped with cotton wool dampened with acetone or de-ionized water.

b. Acid treatment

Some mono-filaments to be included in pull-out samples were immersed in chromic acid for a specified time, after which they were immediately rinsed in de-ionized water followed by washing in running water for 1 to 2 hours. The filaments were given a final immersion in de-ionized water and dried for at least 5 hours in an air oven at 40° C.

c. Plasma treatment

The plasma treatment was applied with a 13.56 MHz Plasma prep 100 equipment made by Nanotech, using oxygen as the plasma carrier gas.

(iii) Production of pull-out samples

Pull-out samples were prepared as in Examples 1 to 26.

Two treatments and four draw ratios were included in this study. The former are: A100/1 and P10/10/10 (according to the code used above in Examples 1–26), while the latter are DR 1:1, DR 8:1, DR 15:1 and DR 30:1. No pull-out tests were carried out with 1:1 monofilaments because these are not sufficiently stiff.

33.2 Study of untreated fibre surfaces

SEM observations were first made of the surface of untreated fibres before incorporation into the matrix resin.

We found that mono-filaments with DR 1:1 present (as seen at low magnification) a corrugated type surface pattern with some axial arrangements of deeper and fairly large holes, probably due to the fabrication conditions. At higher magnification the dendritic structure of a polymer solidified from the melt was revealed. When drawing (stretching) is applied we found that the corrugated surface and the dentritic structure disappear and are replaced by a fibrillated structure which is enhanced as the draw ratio increases.

33.3 Study of treated fibre surfaces

Fibres with different draw ratios and different surface treatments were next examined by SEM before incorporation into composites.

Firstly, we found that acid only treatment does not modify the surface of DR 1:1 mono-filaments but enhances the fibrillar surface structure of drawn fibres.

Secondly, we investigated plasma treated fibres. For DR 1:1 we found that the treatment leaves the corrugated surface largely unaffected. For DR 8:1 we found that plasma treatment leaves the fibrillar structure unaffected. When the draw ratio increases to 15:1 we found that the fibrillar structure disappears and widespread pitting appears. On plasma treatment of DR 30:1 monofilaments the fibrilla surface structure seen on the untreated fibre is again absent, and it is replaced by a strongly pitted pattern with a significant proportion of larger than average pits.

33.4 Observations after pull out

Composites were then formed with fibres having various draw ratios and surface treatments. We then investigated the fibres (mono-filaments) and resin by SEM after pull out of the fibres from the matrix resin. The results obtained are summarised as follows: We found that the high magnification surface profile on the untreated mono-filament surface is not faithfully replicated on the xylene "dissolved" sockets in matrix resin samples from which the filaments were pulled. It appears therefore that the resin does not wet well, the undrawn and untreated polyethylene. The application of plasma treatment (and acid treatment) drastically improves wettability, as is shown by the excellent replication of the "dissolved" socket in the matrix of the details seen on the fibre surface.

(ii) DR 8:1

For treated and untreated mono-filaments a comparison of the matrix grooves (after fibre pull-out) and their respective fibres showed excellent replication of the fibre surfaces by the resin, thus confirming a good degree of wettability. For plasma treated fibre a peeled off layer of fibre is observed; but this is very thin and the failure on pull-out propagates practically close to the matrix/fibre interface.

(iii) DR 15:1

For the untreated mono-filament we investigated the boundary between the matrix immersed and non-immersed regions of the fibre and both surfaces appeared very similar. We saw no evidence of a polymer layer on the corresponding matrix groove after fibre pull-out but, instead, an excellent replication had been achieved. Thus, the resin wets well the surface of the untreated filament but the failure during pull out occurs along the interface.

The plasma treated mono-filaments do offer the means for mechanical interlocking, and we found peeling-off of the fibre in the immersed region. The corresponding "dissolved" matrix socket showed the expected excellent replication of the pitted filament surface by the resin. We concluded that pull-out for the plasma treated, DR 15:1 mono-filament occurs on similar lines to that seen for similarly treated DR 8:1 fibres. However, in the 15:1 DR case the propagation of the failure occurs well within the filament, because appropriate sized pits are available for interlocking with the resin.

(iv) DR 30:1

No difference was found between the immersed and nonimmersed regions of the untreated mono-filaments, whilst the replication of the fibre surface by the resin is good. Thus, in spite of the satisfactory wettability of the filament by the resin, the failure occurs at the interface and very low adhesion is obtained.

A similar situation was seen to apply for very mild acid treatment (although the adhesion was better by a factor of about 3).

For plasma treated mono-filaments however we found that the strongly pitted surface of the fibre is faithfully reproduced by the resin, giving rise to a high degree of mechanical interlinking at the interface. Thus, the system fails along similar lines to that seen for plasma treated DR 15:1 although in this case the pitting gives a stringer interlocking which places the failure of the system well inside the fibre. Plasma treatment and DR 30:1 gives adhesion at least twice as great as that obtained by any other combination of treatment and draw ratio tried.

33.5 Failure mechanisms of pulled-out fibres

We found with plasma treated mono-filaments that the density of broken fibrils near the meniscus in the matrix immersion regions decreases with increasing draw ratio. We concluded that shear failure at the fibre skin cannot take place unless the strongest links between fibre and resin have been broken, and these links are provided by the largest pits on the filament surface. They are conspicuously lacking for DR 8:1 and the initial failure occurs simultaneously at many different points, creating a high density of broken fibrils. For DR 15:1 mono-filaments there is a fairly even distribution of somewhat larger pits among the large numbers of small ones, and the density of broken fibrils decreases. For DR 30:1 there are a few pits substantially larger than all others and this advantageously brings the failure well within the fibre and far from the reach of the other, smaller pits on the surface. In this case the immersion region near the meniscus has the appearance of a ripped-off surface, with a very few, and large, broken fibrils.

EXAMPLE 34

High modulus polyethylene yarn (having a draw ratio greater than 12:1) was obtained. This was given various plasma treatments as described in the above Examples and was woven into fabrics in the same way that conventional fibres are woven. In some cases the treated polyethylene yarn was interwoven with other fibres such as carbon and/or glass to produce hybrids containing various amounts (between 5% and 100% by weight of polyethylene yarn). The fabrics had approximately 16 warp and weft ends per cm.

We found that composites made from the fabrics by setting them in the epoxy and polyester resins mentioned above had varying properties according to the fibres used in each case. However, we found that in each case the polyethylene fibre/matrix resin adhesion level was good following surface treatment of the polyethylene fibres by plasma treatment.

Composite materials comprising highly oriented plasma treated polymer fibres in accordance with the invention within a matrix resin show desirable structural properties. They can have favourable strength to weight and stiffness to weight ratios due to low specific gravity of the reinforcing polymer. They can also exhibit good impact resistance resulting from the high elongation at break of the polymer fibres. Low moisture absorption and good electrical properties may also be exhibited.

The composites also show good transparency much better than is obtained with composites containing conventional polyolefin fibres.

The composites embodying the second aspect of the present invention can thus lend themselves to application in such fields as radomes, aerial covers and dielectric windows, boat and aircraft construction, body armour, sports equipment, eg skis, surf boards, protective clothing and headgear, eg pilots' helmets, plastics glazing materials, and mechanical engineering articles, for example, moving parts in textile machinery such as looms. Other uses will be readily apparent.

We claim:

1. A method of producing a composite material in which a reinforcement material is embedded in a matrix material wherein the improvement comprises the reinforcement material comprising a polymer material having a draw ratio of at least 12:1 which is treated, prior to incorporation in the matrix, by exposing its surface to a plasma discharge, whereby improved adhesion is obtained between the reinforcement material and the matrix material.

2. A method as claimed in claim 1 and wherein the draw ratio of the polymer material is at least 20:1.

3. A method as claimed in claim 2 and wherein the draw ratio of the polymer material is about 30:1.

4. A method as claimed in claim 1 and wherein the adhesion level of the polymer material to the matrix material is at least $10^6 N/m^2$.

5. A method as claimed in claim 4, and wherein the adhesion level is greater than $3 \times 10^6 N/m^2$.

6. A method as claimed in claim 1 and wherein the plasma treatment produces surface pitting on the surface of the reinforcement material giving mechanical interlocking of the pitted surface of the reinforcement material and the complementary surface of the matrix material.

7. A method as claimed in flaim 5 and wherein the surface pitting on the reinforcement material is of a generally uniform nature and the average dimension of each pit is from 0.1 to 4 microns.

8. A method as claimed in claim 1 and wherein the plasma carrier gas used in the plasma discharge treatment is from 6 to 10 cm$^3$ per minute, the power level used in the treatment is not greater than about 10 watts and the time of exposure of the treatment from 2 to 30 minutes.

9. A method as claimed in claim 7 and wherein the polymer material is given a chemical etchant treatment prior to the plasma discharge treatment.

10. A method as claimed in claim 9 and wherein the chemical treatment comprises immersing the polymer material in a bath of chromic acid having a concentration of from 1 to 100 mole percent of $K_2Cr_2O_7$ for from one half of a minute to 10 minutes.

11. A method as claimed in claim 9 and wherein the polymer material is cleaned prior to the plasma discharge treatment, and prior to the chemical etchant treatment, by washing in water or acetone.

12. A method as claimed in claim 11 and wherein a mechanical rubbing treatment is given to the polymer material during cleaning.

13. A method as claimed in claim 1 and wherein the treatment given to the polymer material prior to incorporation in the matrix material is such as not to reduce the ultimate tensile strength of the polymer below $0.4 \times 10^9 N/m^2$.

14. A method as claimed in claim 13 and wherein the treatment given to the polymer material prior to incorporation in the matrix material is such as not to reduce the ultimate tensile strength of the polymer below a level in the inclusive range $0.5 \times 10^9 N/m^2$ to $0.7 \times 10^9 N/m^2$.

15. A method as claimed in claim 1 and wherein the polymer material is in the form selected from: film, fibrillated film, monofilament fibres, multifilament yarn, staple fibres and woven fibres.

16. A method as claimed in claim 15 and wherein the polymer material is in the form of fibres which are formed into a hybrid with other fibres.

17. A method as claimed in claim 16 and wherein the hybrid is of woven fibres and the other fibres comprise fibres selected from fibres of glass, carbon or aramid.

18. A method as claimed in claim 1 and wherein the polymer material is a mono- or co-polyolefin having a Young's modulus in excess of $3 \times 10^{10} N/m^2$.

19. A method as claimed in claim 18 and wherein the polymer material is selected from:
polyethylene, polypropylene, ethylene-propylene block copolymers, and
copolymers of ethylene containing at least 95% by weight of ethylene having a density of from 0.85 to 1.0 gms/cm$^3$.

20. A method as claimed in claim 19 and wherein the polymer material has a weight average molecular weight less than 300,000.

21. A method as claimed in claim 20 and wherein the polymer material has a weight average molecular weight less than 200,000 and a number average molecular weight of from 10,000 to 25,000 the ratio of the weight average molecular weight to the number average molecular weight being less than 8.

22. A method as claimed in claim 20 and wherein the polymer material has a weight average molecular weight less than 200,000 and a number average molecular weight of from 5,000 to 10,000 the ratio of the weight average molecular weight to the number average molecular weight being less than 20.

23. A method as claimed in claim 1 and wherein the matrix material is selected from: thermosetting resin, thermoplastic material with a softening point temperature less than the softening point of the reinforcement polymer material and inorganic cement.

24. A method as claimed in claim 23 and wherein the matrix material is selected from the following:
epoxy, phenolic, vinyl ester, polyester, acrylate, cyanoacrylate and polymethyl methacrylate thermosetting resins.

25. A method as claimed in claim 19 and wherein the polymer reinforcement material is selected from polyethylene, polypropylene and capolymers of ethylene comprising at least 95% by weight of ethylene and wherein the polymer has a weight average molecular weight $\overline{M}_w$ greater than 150,000 and a ratio $\overline{M}_w/\overline{M}_n$ greater than 5, where $M_n$ is the average number molecular weight, and the polymer reinforcement material sustains a creep strain of less than 3% after 15 hours at 20° C. under a stress which produces an initial strain of 10% after 10 seconds.

26. A composite material produced by the method claimed in claim 1 and in which comprises polymeric reinforcement fibres having a draw ratio of at least 12:1 and which have been treated by a plasma discharge surface treatment embedded in a matrix material.

* * * * *